United States Patent [19]

Rodal et al.

[11] Patent Number: 4,866,547
[45] Date of Patent: Sep. 12, 1989

[54] CIRCUIT FOR DETECTING THE END OF A TAPE BY COUNTING REEL REVOLUTIONS

[76] Inventors: David R. Rodal, 3363 Kenneth Dr., Palo Alto, Calif. 94303; Nathan W. Osborn, 25 Hilary La., Redwood City, Calif. 94061

[21] Appl. No.: 176,516

[22] Filed: Apr. 1, 1988

[51] Int. Cl.[4] ............ G11B 15/22; G11B 15/48
[52] U.S. Cl. ................... 360/74.2; 360/137
[58] Field of Search ............... 360/74.2, 137; 242/75.51, 75.52, 186; 318/311–313

[56] References Cited

U.S. PATENT DOCUMENTS

| | | | |
|---|---|---|---|
| 3,564,219 | 2/1971 | Mutziger | 235/92 |
| 3,834,648 | 9/1974 | Rose et al. | 242/186 |
| 3,849,661 | 11/1974 | Beiter | 250/571 |
| 4,172,231 | 10/1979 | d'Alayer de Costemore d'Arc et al. | 318/7 |
| 4,267,564 | 5/1981 | Flores | 360/72.3 |
| 4,280,159 | 7/1981 | Nakayama | 360/137 |
| 4,331,307 | 5/1982 | Furuta | 360/74.2 |
| 4,347,538 | 8/1982 | Klank | 360/74.2 |
| 4,366,371 | 12/1982 | d'Alayer de Costemore d'Arc et al. | 235/92 MP |
| 4,370,684 | 1/1983 | Kanayama et al. | 360/74.2 |
| 4,411,008 | 10/1983 | d'Alayer de Costemore d'Arc et al. | 377/18 |
| 4,496,117 | 1/1985 | Kashiwagi et al. | 242/191 |

FOREIGN PATENT DOCUMENTS 2259497 6/1974 Fed. Rep. of Germany .

OTHER PUBLICATIONS

Werner, "Tape . . . System", IBM Tech. Disc. Bull., vol. 14, No. 2, Jul. 1971, p. 613.
Holman et al., "Rewind . . . Tape", IBM Tech. Disc. Bull., vol. 14, No. 2, Jul. 1971, p. 608.
Roberts, "Linear . . . Servomechanism", IBM Tech. Disc. Bull., vol. 13, No. 10, Mar. 1971, p. 3155.

Primary Examiner—Robert S. Tupper

[57] ABSTRACT

An end-of-tape detection apparatus provides a constant accumulated total of the revolutions of the supply and takeup reels relative to the true end-of-tape defined by the leader-to-tape splice. Counter means stores a value indicative of the true end-of-tape, and also counts and stores the accumulated total of revolutions as the tape is wound onto a reel. Thereafter as tape is pulled from the reel, the approaching end-of-tape is accurately known in terms of the remaining revolutions of the reel. A microprocessor uses the stored value to determine the point at which deceleration of the tape should begin, whereby the tape rapidly is decelerated to a selected speed just prior to true end-of-tape. The tape is stopped upon sensing the leader-to-tape splice.

20 Claims, 3 Drawing Sheets

CIRCUIT FOR DETECTING THE END OF A TAPE BY COUNTING REEL REVOLUTIONS

BACKGROUND AND SUMMARY OF THE INVENTION

The invention relates to circuitry for precisely detecting the end of a tape in an audio or video tape transport apparatus, and for initiating the stopping of tape movement by conventional circuits upon the detection of an approaching end.

In the field of audio and video tape recording, it is common practice to utilize various servo circuits to control the movement of tape between supply and takeup reels of the corresponding tape transport. Typical of such servo circuits are reel servo circuits and capstan servo circuits which are utilized in various fashions to control tension in the tape, as well as to control the movement and speed of the tape while performing the various operations of recording, reproducing and shuttling of the tape from reel to reel. Included in such movement controlling servo circuits is a circuit for determining the approaching end of the tape and for then decelerating the tape in response to such determination, thereby bringing the tape to a stop as rapidly as possible. In addition to stopping quickly, it also is desirable to start the deceleration process as close to the end of the tape as possible so as to reach the end as rapidly as possible. In sophisticated broadcast tape recorders, it is imperative that the movement of the tape, and particularly the shuttling process, be performed at very high speeds which, in turn, requires that the precise end of the tape is known, whereby the maximum shuttle speed can be maintained as long as possible before reaching the end.

However, notwithstanding the desire for speed, it is equally important that the end of the tape which is wrapped about, or secured to, the hub of the reel is not pulled from the hub. That is, either end of the tape must be reached as rapidly as possible when at shuttle speed, but without detaching the tape end from the reel. This is particularly important in tape transports which utilize enclosed cassettes as the supply of tape, wherein the ends of the tape are permanently attached to respective supply and takeup reels within the cassette. Pulling the tape end from the reel would make the cassette inoperative and useless.

Typical of "end-of-tape" detectors presently available, are those systems which measure the amount of tape on a reel utilizing the principle that the rate at which the reel rotates as the tape is wound or unwound therefrom varies in proportion to the amount of tape on the reel. In such systems, a first series of pulses are provided which indicate the rotational velocity of the reel, and a second series of pulses are provided for indicating the linear velocity of the tape.

In one embodiment of this type of end-of-tape detection technique, the number of pulses generated by the linear tape movement are counted during each interval of time between the pulses generated by the rotating reel. The accumulated counts vary in proportion to the amount of tape remaining on the respective reel being unwound, and thus can be used to indicate the approaching end-of-tape.

In a second embodiment of such a technique, the respective successions of pulses generated by the reel rotation and by the linear movement of the tape, are utilized in a different fashion. More particularly, a counter, responsive to the tape movement pulses and the reel rotation pulses, develops a signal representing the ratio of longitudinal tape speed to reel rotational speed. In addition, a tape pack diameter selector produces a preselected ratio of longitudinal tape speed to reel rotational speed corresponding to a desired terminal tape pack diameter. A comparator compares the signal with the preselected ratio, and includes a storage register which produces a control signal which may, for example, decelerate the tape driving means when the signal and the preselected ratio achieve at least one and generally a plurality of value matches in succession.

The end-of-tape detector systems of previous discussion provide generally sophisticated means for determining the end of the tape and for decelerating the tape to a stop upon sensing the approaching end. However, systems such as those above which calculate the distance to the approaching end of the tape, or otherwise use pulses derived from a capstan or idler guide which are indicative of tape movement, require the use of a large safety cushion in terms of time or revolutions of the reel, in order to insure that the end of the tape is not ripped from the reel hub, as will happen if the tape end is actually closer than the calculated distance. Such a condition readily is possible in tape transports where capstans, which impart movement to the tape, can slip when pulling the tape, resulting in an erroneous number of linear pulses being generated by the capstan. This in turn erroneously defines the distance to the end of the tape, and inherently indicates there is more tape on the reel than is actually true. Thus, in such situations, the tape is pulled off the hub, which prohibits further use of the damaged cassette.

As mentioned above, speed in moving tape is very important and, accordingly, it is highly desirable to be able to drive a tape at maximum shuttle speeds to the very end of the tape before coming to a stop. However, it also is imperative that the tape not be detached from the supplying reel, particularly in a tape transport employing a cassette configuration.

The present invention provides a simple yet very sophisticated system for determining the precise end of a tape, while overcoming the disadvantages of previous mention. That is, the end-of-tape determined by the system is not affected by capstan slippage or other tape movement parameters which can negatively affect typical end-of-tape detectors presently being used. To this end, once the end of the tape or nearly the end of the tape is located, the corresponding position is remembered and stored as a preset end-of-tape value. When tape is wound back onto the reel, the number of revolutions accumulated also are stored. Thereafter, if the direction of tape changes again, the revolutions of the reel which now is supplying the tape are counted down until the previously stored end-of-tape value corresponding to the end, or nearly the end of tape, is reached. The value is used to determine a point where a conventional servo circuit is enabled to first rapidly decelerate the tape to a safe speed just before the end-of-tape, whereupon the servo circuit then precisely stops the tape movement in response to detecting the true end-of-tape.

More particularly, reel tachometers are mechanically coupled in conventional fashion to respective supply and takeup reels. A "counter means" include supply and takeup up/down counters coupled to respective reel tachometers, wherein the counter means in essence count each revolution of the respective reels to provide continuous data as to the distance from the "end-of-tape" (on the supply reel), or the "beginning-of-tape" (on the pickup reel). Although the distinction between the terms end-of-tape and beginning-of-tape is made briefly above, the term "end-of-tape" is commonly used in the art and thus is used in the description hereinafter, to indicate either end of the tape. The reel tachometers provide the one or more pulses indicative of each of the revolutions of the respective reels. The system includes a microprocessor/memory means wherein, in the preferred embodiment, the memory defines in part the "counter means" of previous mention in which the preset value indicative of the true end-of-tape is stored. Under control of selected software, the collective "counter means" accumulate and also store the tach pulses corresponding to the revolutions of each reel as the tape is being moved between the supply and takeup reels.

Thus, by way of example, if a full supply reel is to be threaded on a tape transport, once the takeup reel is threaded, or the cassette is loaded, the junction between tape and clear leader is detected by an associated sensor means to define the true end-of-tape. The associated takeup counter means, i.e., memory, is set to a zero value, or to some other selected reference value, at the exact point where the clear leader is spliced to the tape. Thereafter, every revolution of the takeup reel increments the takeup counter means by one or a selected number of counts as the tape is wound onto the takeup reel, and decrements the takeup counter by one or the selected number of counts, when tape subsequently is pulled off the takeup reel and returned to the supply reel. Accordingly, the true end-of-tape on the takeup reel is precisely known and is continuously updated and stored in the associated microprocessor memory via the takeup counter while winding or unwinding tape. The distance to the end-of-tape is stored in terms of the number of reel revolutions; that is, in terms of the number of reel tach pulses indicative of the exact number of revolutions.

Likewise, when the supply reel is threaded and the clear leader-to-tape junction is detected by an associated sensor means, the corresponding end-of-tape is precisely known, and the memory associated with the supply counter means is preset. Thus, the distance to the true end-of-tape also continuously is known while winding tape back onto, or from, the supply reel.

When pulling tape from a reel the microprocessor means continuously monitors the memory of the counter means, and thus is aware of an approaching end-of-tape from either reel. Upon detecting an approaching end-of-tape, the microprocessor means initiates the deceleration of the tape, via a conventional transport tape speed control circuit, to a selected safe speed a preselected short distance prior to the true end-of-tape. The transport then pulls the tape the short distance at the safe speed until the associated sensor means detects the clear leader-to-tape junction, that is, the true end-of-tape. A control signal is supplied to the conventional control circuit to immediately stop the tape. The memory of he counter means is reset to the reference value corresponding to the true end-of-tape, as previously discussed.

In the situation where a system is turned on with tape distributed on both reels, the counter means generally do not contain the preset reference values corresponding to the respective true ends-of-tape. Upon pulling tape in either direction, the transport control system relies upon the conventional prior art end-of-tape detection technique using, for example, the tape pack diameter and ratio of tape speed to reel rotational speed information of previous mention. At such time as tape is pulled to a true end-of-tape, or to nearly the end-of-tape, the end-of-tape detection technique reverts to the invention combination, as further described below.

DETAILED DESCRIPTION OF THE EMBODIMENT

Figure 1:
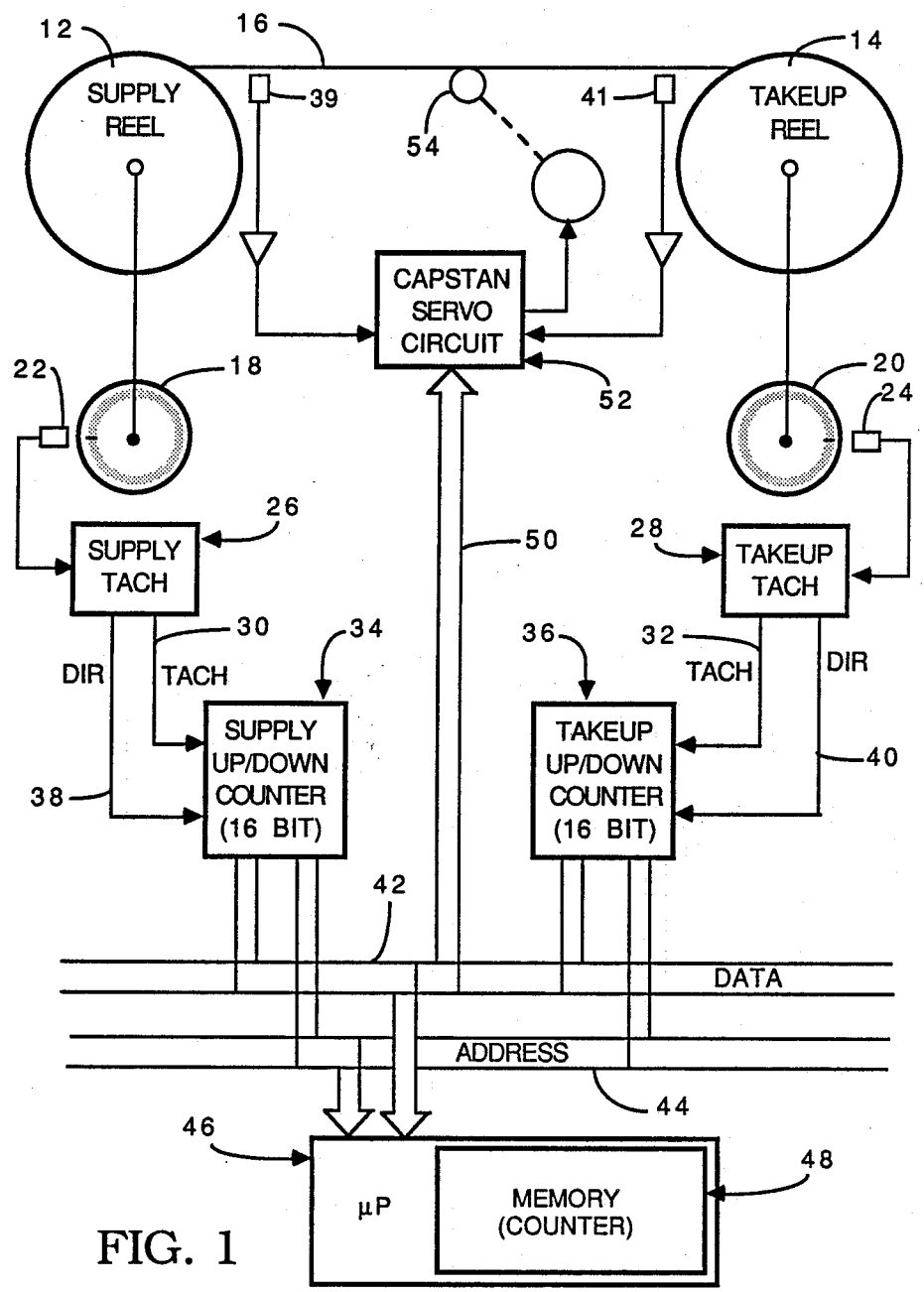
FIG. 1 is a block diagram illustrating an implementation of the invention in the environment of a capstan transport.

Referring to FIG. 1, the block diagram illustrates an implementation of the invention in the environment of supply and takeup reels 12, 14, respectively, in an audio, video, instrumentation, etc., tape transport, wherein a capstan tape drive system provides the reciprocal movement of a magnetic tape 16 from reel to reel. However, it is to be understood that the invention may be used with any transport system where tape is transported between reels. The reels may be an open reel or an enclosed reel cassette configuration. Respective tachometer disks 18, 20 and tach readout means 22, 24 are coupled in conventional fashion to the supply reel 12 and takeup reel 14, respectively, for rotation therewith. The tach readout means 22, 24 are coupled to a supply tachometer 26 and a takeup tachometer 28, respectively, wherein the tachometer means may generate one pulse for each full rotation of the respective reels 12, 14, or may generate hundreds of pulses as in conventional tach systems in video tape recorder apparatus. Obviously, various types of pulse generating schemes may be employed as long as the scheme supplies a pulse count which represents the exact number of revolutions of the reel. The pulses representing each revolution of the supply and takeup reels are supplied as tach signals on lines 30, 32, respectively, to up/down supply and takeup counters 34, 36, respectively. The supply and takeup tachometers 26, 28, also supply direction signals via lines 38, 40, respectively, to the supply and takeup counters 34, 36. As previously mentioned, in one embodiment the tach signal, in effect, supplies a pulse for each revolution of the respective supply and takeup reels, regardless of the size of the tape pack; that is, regardless of the diameter of the tape pack thereon. In another embodiment, the tach system may supply, for example, 2000 pulses for every revolution of the reels, which pulses are manipulated via software to provide digital values which represent each revolution. The direction signals on lines 38, 40, consist of a high or a low logic level, indicating whether the reels are operating in the forward or reverse direction.

The counters 34, 36 depicted herein as hardware counters, are coupled to a data bus 42 and an address bus 44. The buses in turn are coupled to a microprocessor means 46 which, in the embodiment of FIG. 1, includes a memory 48 such as, for example, a 16 bit counter shown here. For purposes of description, the supply up/down counter 34 and memory 48 comprise a supply counter means, while the takeup up/down counter 36 and memory 48 comprise a takeup counter means, wherein accordingly, "counter means" is meant to include a hardware, a software, or the hardware/-software combination configuration illustrated in FIG. 1 and described below. The microprocessor means 46 further provides for presetting the memory 48 to zero, or to a selected reference value, at such time as the true end-of-tape (clear leader-to-tape splice) is detected by respective sensor means 39, 41 disposed to view the tape as it is pulled from the respective reels. In addition, when approaching an end-of-tape, the counter count approaches the reference value, and the microprocessor means 46 provides a velocity control signal on a bus 50 (corresponding to the data bus 42), as depicted in the software routine illustrated in the flow diagram of FIG. 4. In the embodiment of FIG. 1, the control signal is supplied to a conventional capstan servo circuit 52 which, in turn, decelerates a capstan 54 and thus the tape 16 to a preselected safe speed, for example, 8× play speed, in accordance with a desired deceleration or cue profile characteristic, in a process well known in the art. When the true end-of-tape is detected by the respective sensor means 39 or 41, the capstan servo circuit 52 stops the tape. Examples of transport servo circuits which can be used to implement the deceleration of a tape to a selected speed and a stop are well known in the art and are described, for example, in U.S. Pat. No. No. 3,736,565, issued May 29, 1973, to G.. Sidline, U.S. Pat. No. 4,267,564, issued May 12, 1981, to C. Flores, and U.S. Pat. No. 4,731,679 issued Mar. 15, 1988 to D. O'Gwynn, which patents are assigned to the same assignee as this application.

In such a deceleration process, given a preselected tape speed such as 60× play speed when in the shuttle mode, the microprocessor means 46 knows the tape distance, or number of revolutions, it takes to decelerate the tape to a safe speed at a point immediately prior to the true end-of-tape. The distance for deceleration to the selected safe speed is determined by the dynamics of the tape transport, as known in the art. Accordingly, the microprocessor means 46 is aware of when the required distance to the approaching end-of-tape is reached in the counter means, and supplies the control signal via bus 50 to direct the capstan servo circuit 52 to decelerate the tape rapidly to an 8× play speed when it reaches a predetermined point just prior to the end-of-tape. The tape is pulled the remaining margin (for example, ½ second) at 8× play speed until the associated sensor means 39 or 41 detects the leader-to-tape junction corresponding to the true end-of-tape. The tape movement then is immediately stopped by a signal to the capstan servo circuit 52 from the sensor means.

The counter means shown herein formed of the memory 48 and counters 34, 36 may be implemented in various configurations. For example, the counters 34, 36 and memory 48 may be separate 16 bit hardware counters with memory 48 implemented in software in the microprocessor means 46, as depicted in FIG. 1. In another configuration, 32 bit counters 34, 36 may be used in an all hardware implementation, under control of the microprocessor 46. In a further configuration, the entire 32 bit memory or counter means may be in the microprocessor means 46, whereby the tach pulses and direction signals are supplied directly to the means 46 in form compatible to the microprocessor. Thus, if microprocessor means 46 is a small dedicated microcontroller with available interrupt lines, the outputs of the tachs 26, 28 may be supplied to the microcontroller as interrupt signals. The microcontroller intepret the tach pulses to thereby accumulate or subtract the number of revolutions while also determining the direction of reel rotation.

Thus the counter means may be implemented in hardware, in software or, as depicted in FIG. 1, in a hardware/software combined configuration. This latter arrangement eases the time demands placed on the microprocessor means (or microcontroller) 46, while providing a scheme which, in essence, efficiently turns a 16 bit counter into a 32 bit counter.

More particularly, the memory 48 defines the portion of the counter means which stores the values indicative of the number of revolutions of the respective reels 12, 14. The up/down counters 34, 36 are not preset and are used to count the actual tach pulses as they are generated. Upon filling, the counters 34, 36 send a carry in the form of 16 bits to the memory 48 which slowly counts up or down depending upon the direction of tape travel. The reference values corresponding to the ends-of-tape detected by the sensor means 39, 41, are preset in the memory 48, and are used by the microprocessor means 46 to monitor an approaching end-of-tape and to determined the point that the deceleration process should be initiated, as further described in FIGS. 2-4.

The tape sensor means 39, 41 of previous mention, provide means for detecting the clear leader-to-tape junction, or splice point, and are disposed to view the tape at respective positions as close as possible to the respective reels to minimize the amount of leader which is pulled off the reel before detecting the junction. Since this point is precisely repeatable at either end of the tape, it is used to define the true end-of-tape. The sensor means 39, 41 are coupled to the capstan servo circuit 52 via respective amplifiers, and the circuit 52 provides signals to the microprocessor means 46 indicating the presence of clear leader or opaque tape. In turn, the microprocessor means 46 then directs the capstan servo circuit 52 to immediately stop the tape. In practice, when the tape approaches the end-of-tape as previously discussed, the clear leader-to-tape junction will overshoot and pass the junction before the tape is stopped. Since the amount of overshoot will depend on the velocity of the tape, the precise position of the junction upon stopping the tape is not known. If an operator asks for further tape movement in the same direction, i.e., off the reel, the capstan servo circuit 52 will not comply. If the operator asks for tape movement back in the tape direction, the circuit 52 will move tape but only at normal play speed. When the pertinent sensor 39 or 41 detects the precise leader-to-tape junction, i.e., the true end-of-tape, the microprocessor means 46 sets the counter means (memory 48) to the zero or reference value indicative of the true end-of-tape. The tape then is pulled at whatever speed was requested. In practice, as long as a sensor sees clear leader, the memory 48 is continually being reset. As soon as tape is detected, the memory 48 starts accumulating the reel revolutions, as supplied by the respective counter 34 or 36.

Typical of an optical sensor means which may be used as sensor means 39, 41, is that described in U.S. Pat. No. 4,730,108 issued Mar. 8, 1988 to D. Rodal, et al, and assigned to the same assignee as this application.

Figure 2:
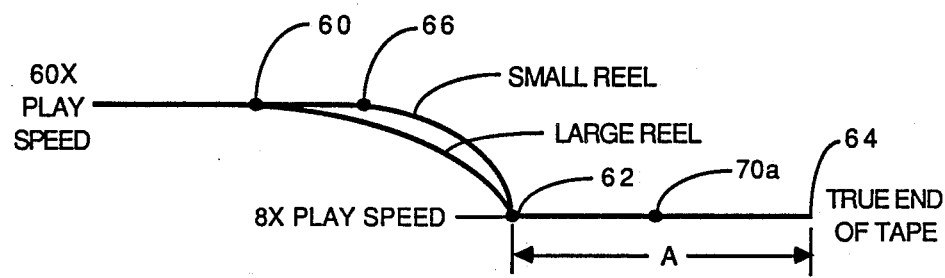
FIG. 2 is a graph depicting the detection of an end-of-tape, and the deceleration of the tape relative to time, for prior art systems.

By way of illustrating the advantageous operation of the invention, FIG. 2 depicts a graph showing time versus tape speed of operation, that is, shows a deceleration curve, for a tape transport using a typical end-of-tape detector circuit. The curve depicts the transport pulling tape in shuttle at 60 times playback speed as an end-of-tape is approached. In prior art schemes using, for example, both reel and capstan tachometer pulse ratio and tape pack to calculate the amount of tape remaining, a large time cushion is necessary to insure that the end of the tape is not closer than calculated, as would be the case when capstan slippage has occurred. More particularly, when the calculation determines a precalculated distance from the tape end, indicated graphically as point 60 when using a large reel, the capstan servo begins to decelerate the tape so that the tape reaches 8× play speed by the time the calculated end-of-tape 62 is reached. The tape then is pulled at 8× play speed for the remaining amount of tape, over a time cushion distance A depicted herein, until the true end-of-tape 64 is reached and the capstan servo stops the transport. As may be seen, the cushion distance A is a considerable period (of the order of 20 to 30 seconds) in order to insure that the end-of-tape is not overrun. This is necessary, because the technique does not know the true end-of-tape 64, and thus the calculated end-of-tape 62 may be in error. The process of stopping a small reel, which has less inertia and can be stopped more quickly, is initiated at point 66 and also reaches 8× play speed at the calculated end-of-tape 62.

Figure 3:
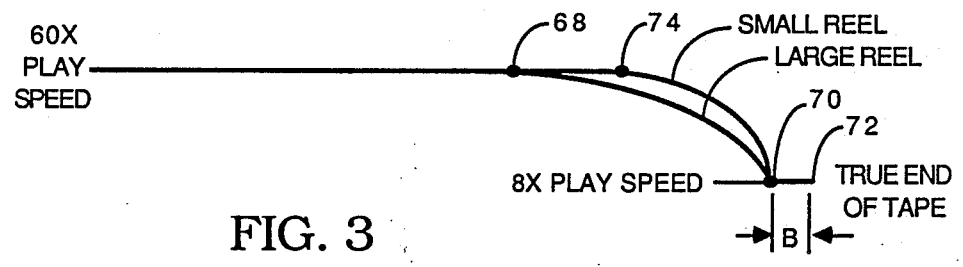
FIG. 3 is a graph similar to that of FIG. 2, depicting the detection of an end-of-tape, and the deceleration to a stop relative to time, utilizing the of FIG. 1.

FIG. 3 depicts the corresponding operation of the invention scheme of FIG. 1, wherein the number of revolutions of, for example, the supply reel 12 as it accumulates tape, has been accurately counted by the counter means 34, 48. As the tape transport is proceding at shuttle speed back towards the end of the tape on the supply reel 12, the counter 34 decrements to thereby decrement the memory 48 towards the preset zero value indicative of the true end-of-tape. The microprocessor means 46 is aware of the distance required to decelerate the tape to 8× play speed, and further knows the true end-of-tape from the stored reference value. Thus the microprocessor means 46 knows the location of a point 70 corresponding to a remembered value, and can use the information with the known dynamic information on the transport to determine a point 68 at which deceleration should start. At point 68 (for a large reel) the control signal is supplied on bus 50 to initiate the deceleration of the tape by the conventional capstan servo circuit 52 to slow the tape to the desired, safe, 8× play speed at such time as it reaches the point 70. The tape then is pulled at the 8× play speed to the true end-of-tape 72 (corresponding to the clear leader-to-tape junction) over a relatively short cushion distance B of the order of ½ second. At such time that the sensor 39 detects the leader-to-tape junction, the capstan servo circuit 52 is informed, and the tape transport is stopped. When using small reels, the deceleration begins later at a point 74 as also illustrated in FIG. 3.

As shown pictorially, the time cushion distance B from the true end-of-tape 72 for the invention system of FIGS. 1 and 3, is of the order of 30 to 60 times shorter than the cushion distance A of prior art systems depicted in FIG. 2. The much shorter cushion is possible because the true end-of-tape is precisely known, and thus the calculation of point 68 (or 74) is extremely accurate and can be relied upon. Thus, the process of shuttling a tape to its end and then decelerating to a stop at the true end-of-tape is substantially more efficient when using the invention. This increased efficiency is due to the fact that the precise number of revolutions to the true end-of-tape is more accurately known in the invention system illustrated in FIG. 1.

Regarding further the interaction between the invention circuit and the conventional transport circuits, the counter means continually counts the reel revolutions and updates its contents, even though the invention circuit is not used unless the true end-of-tape, or nearly end-of-tape, is detected. Thus, as an end-of-tape is approached, the conventional circuits are aware of the calculated end-of-tape, point 62 of FIG. 2. However, once the tape is pulled past the point 62 and continues to be pulled towards the true end-of-tape 64, the invention end-of-tape detection circuit continues to count and store reel revolution values. If the tape direction were to be reversed after point 62, but before the true end-of-tape 64, the memory 48 of the invention stores the value corresponding to this point (70a of FIG. 2) and, since it is closer to the true end-of-tape than is point 62, the invention circuit will control the tape movement with the closer value the next time the same end-of-tape is approached. Thus, the invention circuit includes a learning mode wherein the memory 48 retains the value of a point which is nearer the true end-of-tape each time the tape is pulled nearer to the true end-of-tape. Obviously, if the true end-of-tape (64 or 72) is detected, then the invention circuit will set the memory 48 and will thereafter perform the most efficient end-of-tape detection process, as depicted in FIG. 3 and described herein. Thus it may be seen that if the true end-of-tape is not detected, the conventional end-of-tape circuitry is used to control the tape transport when that same end is approached. Once an end is approached past the point depicted at 62 (FIG. 2), and particularly if the true end-of-tape is detected, than the new, closer point or true end-of-tape will be used under control of the invention end-of-tape detection circuit.

Figure 4:
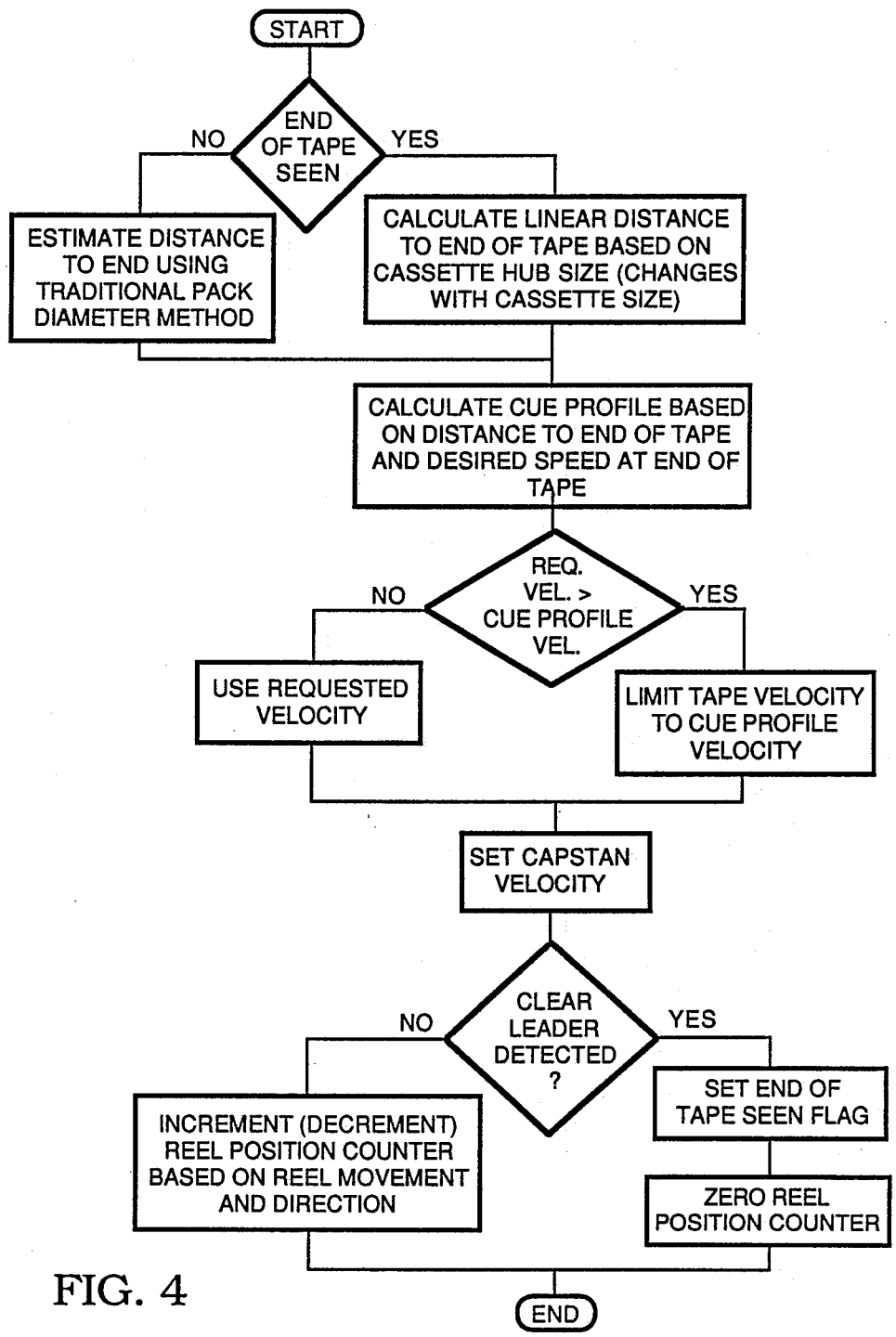
FIG. 4 is a flow chart illustrating a software routine for controlling the system of FIG. 1.

FIG. 4 depicts the main routine commensurate with the various operating points shown in FIG. 3, as well as the process of determining the position of the tape and the position of the point 70, and of initiating the rapid deceleration of the tape to a stop as close as possible to the true end-of-tape 72. More particularly, the system is turned on and the routine asks if an end-of-tape is seen; that is, has the system detected a leader-to-tape junction via a sensor 39, 41. If a true end-of-tape is not detected, such as for example in the situation where tape is distributed on both reels, the invention circuit is not used and the routine estimates the distance to the point 62 using the conventional end-of-tape detection scheme normally in the tape transport apparatus, such as the tape pack diameter versus rotational speed method. Typical of such conventional end-of-tape detection circuits are those described in U.S. Pat. No. 3,834,648, issued Sept. 10, 1974 to M. Rose, et al, and U.S. Pat. No. 4,561,608 issued Dec. 31, 1985 to D. O'Gwynn, with both assigned to the assignee of this application. The routine continues then to the right side of the routine where the deceleration curve, or cue profile, is calculated based on the distance to the end-of-tape and the speed desired when the point 62 (FIG. 2) is reached. The routine then asks if the speed requested is greater than the calculated cue profile velocity and if not, the requested velocity is used to set the capstan velocity. If yes, the tape speed is limited to the calculated cue profile velocity and is used to set the capstan velocity.

The tape is pulled at the prescribed velocity while the routine continually asks if clear leader is detected. As long as clear leader is not detected, the counters 34, 36 and memory 48 continually are incremented or decremented depending upon the respective reel rotation and direction. When clear leader is detected by the sensors 39, 41, as at points 64 or 72 of FIGS. 2, 3 respectively, an end-of-tape seen flag is supplied via the control bus 50 to the capstan servo circuit 52 to stop the tape movement. At this time, since true end-of-tape in the form of the clear leader-to-tape junction is known, the memory 48 is reset to provide its preset reference value of previous mention.

Returning to the top of the routine, if a true end of tape corresponding to the leader-to-tape splice is detected, the invention routine calculates the linear distance to the point 70 based on the cassette hub size, which changes with the size of the cassette and is compensated for if different size cassettes are used. The routine then calculates the cue profile based upon the calculated distance and the desired speed at the point 70, and the routine continues as previously described. However, it may be seen that the point 70 is very near to the true end-of-tape and accordingly, the tape is pulled at a higher velocity until very close to the true end-of-tape, thereby increasing the efficiency of the tape transport.

What is claimed is:

1. A circuit for detecting an approaching end-of-tape of a tape that is being unwound from a reel, comprising:
   means responsive to the end-of-tape condition for supplying an end-of-tape signal representative of a preset value indicative of the end-of-tape;
   means responsive to rotation of the reel for generating pulses indicative of each revolution of the reel;
   means responsive to the generating means for counting the number of pulses indicative of the revolutions as tape is wound onto the reel; and
   means responsive to the counting means for determining the end-of-tape when the number of counted pulses remaining when unwinding tape from the reel corresponds to the preset value indicative of the end-of-tape.

2. The circuit of claim 1 wherein the counting means accumulates and subtracts pulses indicative of each reel revolution as the tape is wound onto the reel and unwound from the reel, respectively.

3. The circuit of claim 2 wherein the counting means includes:
   memory means integral with the counting means for storing the total pulses accumulated and deleted as tape is wound onto the reel and unwound from the reel, respectively.

4. The circuit of claim 3 wherein the memory means is loaded with said preset value indicative of the end-of-tape in response to the end-of-tape signal, and accumulates at least one pulse for each revolution of the reel as tape is wound onto the reel.

5. The circuit of claim 1 wherein said determining means includes:
   microprocessor means responsive to the preset value for determining a deceleration point prior to the end-of-tape;
   means responsive to the presence of the deceleration point for decelerating the tape to a preselected velocity; and
   wherein the microprocessor means is responsive to said end-of-tape signal to stop the tape movement.

6. The circuit of claim 1 wherein:
   the supplying means includes sensor means for monitoring the tape and for supplying the end-of-tape signal upon sensing the presence of clear leader; and
   the generating means includes a pulse generating tachometer rotatably coupled to the reel.

7. The circuit of claim 1 wherein:
   the counting means includes an up/down counter responsive to the generating means and memory means responsive to the up/down counter; and
   the determining means includes microprocessor means for loading the preset value into the memory means.

8. The circuit of claim 7 wherein the microprocessor means further initiates stopping of the tape movement in response to the preset value and to the end-of-tape signal.

9. The circuit of claim 8 wherein the determining means further includes:
   said microprocessor further determining a deceleration point prior to the end-of-tape in response to said preset value;
   means responsive to the presence of the deceleration point for decelerating the tape to a preselected velocity immediately prior to the o end-of-tape; and
   wherein the microprocessor means initiates stopping the tape movement in response to said end-of-tape signal.

10. A circuit for detecting an approaching end-of-tape of a tape that is being moved between first and second reels, comprising:
    means responsive to the reels for generating first and second trains of pulses indicative of each revolution of the respective reels;
    means responsive to the generating means for counting the pulses in the respective first and second trains of pulses;
    means for providing preset values indicative of the respective ends-of-tape at either end thereof; and
    means responsive to the counting means for determining the end-of-tape when the counted pulses remaining when pulling tape from a reel corresponds to the preset value for the respective end-of-tape.

11. the circuit of claim 10 wherein the determining means includes:
    means responsive to one of the preset values for initiating the stopping of the tape at the corresponding end-of-tape.

12. The circuit of claim 11 wherein the initiating means includes:
    microprocessor means responsive to the preset values for determining a deceleration point prior to the corresponding end-of-tape;
    means responsive to the deceleration point for decelerating the tape to a preselected velocity immediately prior to the corresponding end-of-tape; and
    means responsive to the end-of-tape for supplying an end-of-tape signal to the microprocessor means for stopping the tape movement.

13. The circuit of claim 10 wherein the generating means include first and second tachometer means responsive to the rotation of the first and second reels respectively, for generating said first and second trains of pulses.

14. The circuit of claim 10 wherein the counting means includes first and second up/down counters responsive to said first and second tachometer means for counting said first and second trains of pulses.

15. The circuit of claim 10 wherein the counting means includes memory means for storing said preset values, for accumulating pulses of said respective trains of pulses when tape is wound onto a respective reel, and for deleting pulses of said trains of pulses from the respective accumulated pulses when the tape is unwound from the respective reel.

16. The circuit of claim 15 wherein the determining means includes:
   means responsive to the end-of-tape for supplying an end-of-tape signal; and
   microprocessor means responsive to the preset values and to the end-of-tape signal for initiating the stopping of tape movement.

17. A circuit for detecting an approaching end-of-tape of a tape being pulled from a reel, wherein the end-of-tape is threaded onto the reel, comprising:
   means responsive to he rotation of the reel for generating pulses indicative of each revolution of the reel as the previously threaded tape is pulled onto the reel;
   means responsive to the generating means for counting the pulses indicative of each revolution as tape is pulled onto the reel and also as tape subsequently is pulled back off the reel; and
   means responsive to the counting means for determining the end-of-tape when the number of revolutions counted as the tape is pulled from the reel corresponds to the number of revolutions counted as the tape was pulled onto the reel.

18. The circuit of claim 17 including:
   means for storing a value indicative of the end-of-tape; and
   means responsive to the stored value for selectively decelerating the tape immediately prior to the end-of-tape and for stopping the tape in response to the occurrence of the end-of-tape.

19. The circuit of claim 18 wherein the means for storing includes memory means integral with the counting means.

20. The circuit of claim 18 wherein the means for selectively decelerating includes:
   microprocessor means integral with the determining means, for determining a decelerating point prior to the end-of-tape;
   means responsive to the end-of-tape for supplying an end-of-tape signal; and
   wherein the microprocessor means initiates stopping the tape in response to the end-of-tape signal.

* * * * *